(12) United States Patent
Song (10) Patent No.: US 9,032,279 B2
(45) Date of Patent: May 12, 2015

(54) MEMORY DEVICE

(71) Applicant: SK Hynix Inc., Gyeonggi-do (KR)

(72) Inventor: Choung-Ki Song, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 79 days.

(21) Appl. No.: 13/716,342

(22) Filed: Dec. 17, 2012

(65) Prior Publication Data

US 2013/0346836 A1    Dec. 26, 2013

(30) Foreign Application Priority Data

Jun. 20, 2012 (KR) .................. 10-2012-0066004

(51) Int. Cl.
*G06F 11/10* (2006.01)

(52) U.S. Cl.
CPC ..................... *G06F 11/10* (2013.01)

(58) Field of Classification Search
CPC ... G06F 11/10; G06F 11/1076; H04L 1/0057; H03M 13/116; H03M 13/118
USPC ................... 714/800, 801, E11.032
See application file for complete search history.

(56) References Cited

U.S. PATENT DOCUMENTS

| | | | | |
|---|---|---|---|---|
| 6,014,341 A | * | 1/2000 | Koshikawa | 365/233.12 |
| 7,283,380 B1 | * | 10/2007 | Srinivasan et al. | 365/49.17 |
| 2004/0190365 A1 | * | 9/2004 | Ellis et al. | 365/233 |
| 2010/0177583 A1 | * | 7/2010 | Koshizuka | 365/222 |
| 2012/0007631 A1 | * | 1/2012 | Koo et al. | 326/30 |
| 2013/0179758 A1 | * | 7/2013 | Hwang et al. | 714/801 |

FOREIGN PATENT DOCUMENTS

KR    1020100048572    5/2010

* cited by examiner

*Primary Examiner* — Albert Decady
*Assistant Examiner* — Kyle Vallecillo
(74) *Attorney, Agent, or Firm* — IP&T Group LLP (57) ABSTRACT

A memory device includes a parity circuit configured to detect presence or absence of an error using a plurality of command signals and a plurality of address signals, a command shift circuit configured to shift the plurality of command signals by a preset delay value in synchronization with a control clock, a clock control circuit configured to deactivate the control clock when there is no valid command signal in command signals being shifted in the command shift circuit, and a decoder circuit configured to decode a plurality of command signals output from the command shift circuit.

8 Claims, 7 Drawing Sheets

MEMORY DEVICE

CROSS-REFERENCE TO RELATED APPLICATIONS

The present application claims priority of Korean Patent Application No. 10-2012-0066004, filed on Jun. 20, 2012, which is incorporated herein by reference in its entirety.

BACKGROUND

1. Field

Exemplary embodiments of the present invention relate to a memory device, and more particularly, to a technology for detecting an error of a command and an address.

2. Description of the Related Art

One of methods for checking an error of data transmitted/received is a parity check. The parity check indicates an error check for setting the number of data, which has a value of '1', of received multi-bit data as one of an even and an odd and checking whether a data bit having a value of '1' of the received multi-bit data coincides with the even or the odd. For example, in the case of an even parity check, if the number of data having a value of '1' of the received multi-bit data is an even, it is determined that there is no error, and if the number of data is an odd, it is determined that there is an error. Meanwhile, in the case of an odd parity check, if the number of data having a value of '1' of the received multi-bit data is an odd, it is determined that there is no error, and if the number of data is an even, it is determined that there is an error.

In a conventional memory device, the parity check has been performed in order to check whether there is an error in data. However, as the number of bits of a command signal and an address signal is increased and the transmission speed of the command signal and the address signal becomes fast, there have been increasing demands for performing the parity check for the command signal and the address signal. As a consequence, various designs for performing a parity check for a command and an address have been discussed. Therefore, a method for checking a parity of the command and the address and a method for substantially preventing the execution of a corresponding command when an error has been detected are in need.

SUMMARY

An embodiment of the present invention is directed to a memory device that checks the presence or absence of an error of a command using the command and an address, and efficiently prevents the execution of the command while consuming a minimum amount of current when checking the error of the command.

In accordance with an embodiment of the present invention, a memory device includes: a parity circuit configured to detect presence or absence of an error using a plurality of command signals and a plurality of address signals; a command shift circuit configured to shift the plurality of command signals by a preset delay value in synchronization with a control clock; a clock control circuit configured to deactivate the control clock when there is no valid command signal in command signals being shifted in the command shift circuit; and a decoder circuit configured to decode a plurality of command signals shifted by the command shift circuit.

In accordance with another embodiment of the present invention, a memory device includes: a parity circuit configured to detect presence or absence of an error using a plurality of command signals and a plurality of address signals, to generate asynchronous error information, and to generate synchronous error information by synchronizing the asynchronous error information with parity latency; a command shift circuit configured to shift the plurality of command signals by a delay value corresponding to the parity latency in synchronization with a control clock, to output shifted command signals, and to initialize command signals being shifted when the asynchronous error information indicates generation of an error; a clock control circuit configured to deactivate the control clock when there is no valid command signal in the command signals being shifted in the command shift circuit; a decoder circuit configured to decode command signals shifted by the command shift circuit; a command/address shift circuit configured to shift the plurality of command signals and the plurality of address signals by a delay value corresponding to the parity latency in synchronization with the control clock, to output shifted command signals; and an error log circuit configured to store command signals and address signals, which has been shifted by the command/address shift circuit, when the synchronous error information is activated.

According to the present invention, when the presence or absence of an error in a command is checked and the error of the command is detected, the command is directly prevented from being transferred to the decoder circuit, so that the erroneous command is not performed.

Furthermore, in a period other than a period in which a command is actually input to a memory, a control clock is deactivated, resulting in the reduction of current consumption of circuits related to the detection of the presence or absence of an error in a command and the prevention of execution of an erroneous command.

DETAILED DESCRIPTION

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, reference numerals correspond directly to the like numbered parts in the various figures and embodiments of the present invention. In addition, a singular form may include a plural form as long as it is not specifically mentioned in a sentence.

Figure 1:
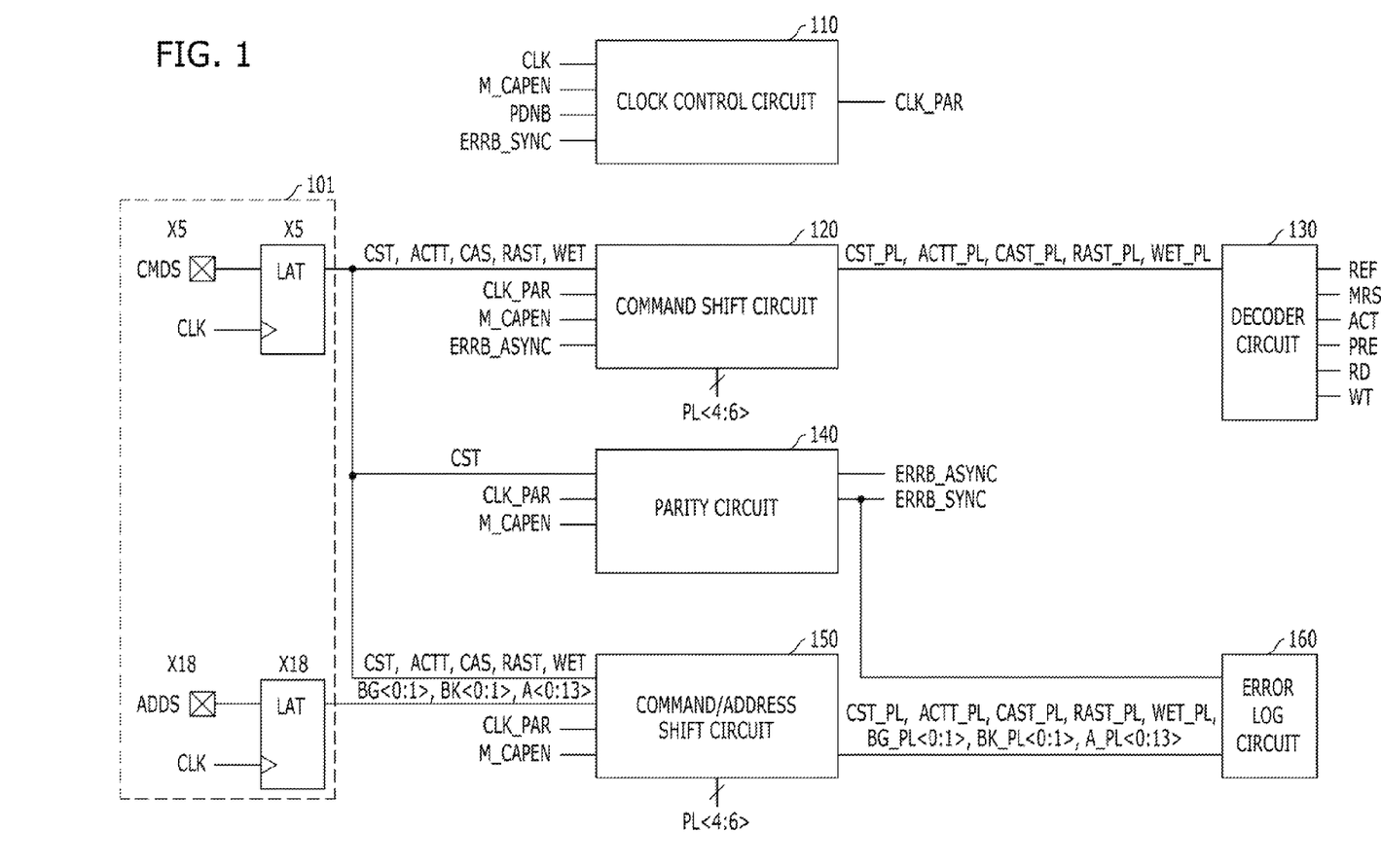
FIG. 1 is a configuration diagram of a memory device in accordance with an embodiment of the present invention.

FIG. 1 is a configuration diagram illustrating a memory device in accordance with an embodiment of the present invention.

Referring to FIG. 1, the memory device includes a clock control circuit 110, a command shift circuit 120, a decoder circuit 130, a parity circuit 140, a command/address shift circuit 150, and an error log circuit 160.

A reception circuit 101 is configured to receive command signals CMDS and address signals ADDS input from an external source, to latch the signals, and to provide the signals to internal circuits of the memory device. For example, the reception circuit may include 23 buffers and 23 latches. Among them, five buffers and five latches may be used to receive the command signals, and 18 buffers and 18 latches may be used to receive the address signals.

The clock control circuit 110 is configured to receive a clock CLK and generate a control clock CLK_PAR, which is to be used in the shift circuits 120 and 150 and the parity circuit 140. The clock control circuit 110 deactivates the control clock CLK_PAR, that is, the clock control circuit 110 stops toggling the control clock CLK_PAR when one or more of the following four conditions (1) to (4) are satisfied: (1) When there is no valid command signal in command signals being shifted in the command shift circuit 120, and no activated command signals CST, ACTT, CAST, RAST, and WET have not been applied to the memory device for some time, control and shifting operations using the control clock CLK_PAR is not required; (2) When an error is detected by the parity circuit 140, since it is not necessary to transfer commands being shifted in the command shift circuit 120 to the decoder circuit 130, the control clock CLK_PAR is deactivated; (3) When a parity check function has been deactivated, that is, when a current mode is not a parity mode for detecting an error, (the control clock CLK_PAR is related to a parity check); and (4) When a current mode is a power-down mode, the clock control circuit 110 activates the control clock CLK_PAR. The clock control circuit 110 activates the control clock CLK_PAR that is supplied to circuits related to a parity check of a command, only in a desired period, thereby reducing current consumption of the memory device. The clock control circuit 110 will be described in detail with reference to FIG. 4.

The command shift circuit 120 is configured to shift the command signals CST, ACTT, CAST, RAST, and WET by parity latency (PL) in synchronization with the control clock CLK_PAR. The parity latency (PL) is latency required for the parity check of the command, and may be set by a mode register set (MRS) of the memory device. When an error of a command is detected by the parity circuit 140, the command shift circuit 120 initializes the command signals being shifted therein to a deactivated state. Since the command signals in the command shift circuit 120 are initialized when the error of the command is detected, the decoder circuit 130 receives no valid command signals and the memory device does not perform any operation corresponding to the erroneous command. When a parity mode has not been set, the command shift circuit 120 outputs the command signals CST, ACTT, CAST, RAST, and WET as is without shifting (delaying) them. The command shift circuit 120 will be described in detail with reference to FIG. 2.

The decoder circuit 130 is configured to decode command signals CST_PL, ACTT_PL, CAST_PL, RAST_PL, and WET_PL shifted by the command shift circuit 120, and to generate command signals REF, MRS, ACT, PRE, RD, and WT. The command signals include a refresh command REF, a mode register set command MRS, an active command ACT, a precharge command PRE, a read command RD, a write command WT, and the like. The memory device performs operations corresponding to the command signals REF, MRS, ACT, PRE, RD, and WT generated by the decoder circuit 130.

The parity circuit 140 is configured to detect an error of a plurality of command signals (for example, CST, ACTT, CAST, RAST, and WET) and a plurality of address signals (for example, A<0:13>, BK<0:1>, and BG<0:1>) in synchronization with the control clock CLK_PAR. In the case in which the parity circuit 140 uses an even parity check scheme, when the number of signals with a value of '1' is even among the command signals CST, ACTT, CAST, RAST, and WET and the address signals A<0:13>, BK<0:1>, and BG<0:1>, it is determined that there is no error. Otherwise, it is determined that there is an error. Meanwhile, in the case in which the parity circuit 140 uses an odd parity check scheme, when the number of signals having a value of '1' is an odd, it is determined that there is no error, and when the number of signals having a value of '1' is an even, it is determined that there is an error. For the sake of convenience, in this description of the embodiment of the present invention, it is assumed that the parity circuit 140 uses the even parity check scheme. As a result of the parity check, when an error is detected, the parity circuit 140 activates two types of error information ERRB_ASYNC and ERRB_SYNC. Between them, the asynchronous information ERRB_ASYNC is activated to a 'low' level when the parity circuit 140 detects an error, and the synchronous information ERRB_SYNC is the asynchronous information ERRB_ASYNC synchronized with parity latency. The asynchronous information ERRB_ASYNC is activated at an approximate time point of when the parity circuit 140 detects an error, and the synchronous information ERRB_SYNC is activated after the delay of the parity latency. The parity circuit 140 will be described in detail with reference to FIG. 5 to FIG. 8.

The command/address shift circuit 150 is configured to shift the plurality of command signals CST, ACTT, CAST, RAST, and WET and the plurality of address signals A<0:13>, BK<0:1>, and BG<0:1> by a value of the parity latency PL, and to output shifted signals, in synchronization with the control clock CLK_PAR. The command/address shift circuit 150 may have a configuration similar to that of the command shift circuit 120. However, the command/address shift circuit 150 is different from the command shift circuit 120, in that the command/address shift circuit 150 does not initialize command signals and address signals being shifted even when an error is detected by the parity circuit 140. The command/address shift circuit 150 is a circuit for transferring erroneous command signals and address signals to the error log circuit 160 when the error is detected. When a parity mode is not set, the command/address shift circuit 150 outputs the input command signals CST, ACTT, CAST, RAST, and WET and address signals A<0:13>, BK<0:1>, and BG<0:1> without shifting (delaying) them. The command/address shift circuit 150 will be described in detail with reference to FIG. 3.

The error log circuit 160 is configured to store command signals CST_PL, ACTT_PL, CAST_PL, RAST_PL, and WET_PL and address signals A_PL<0:13>, BK_PL<0:1>, and BG_PL<0:1>. The command signals have been shifted by the command/address shift circuit 150, when the error of the command is detected by the parity circuit 140, that is, at the time of activation of the synchronous information ERRB_SYNC. The command signals and address signals, which correspond to the error and are stored in the error log circuit 160, are transferred to a memory controller under the control of the memory controller. It is possible for the memory controller to determine a command having an error, among commands applied from the memory controller to the memory device, using information transferred from the error log circuit 160. The error log circuit 160 will be described in detail with reference to FIG. 9.

For the command signals described above, CST indicates a chip select signal, ACTT indicates an active signal, RAST indicates a row address strobe signal, CAST indicates a column address strobe signal, and WET indicates a write enable signal. These command signals are in an activated state with a level of value '1'. Furthermore, for the address signals, A<0:13> indicate $0^{th}$ to thirteenth addresses, BK<0:1> indicate $0^{th}$ and first bank addresses, and BG<0:1> indicate $0^{th}$ and first bank group addresses.

Figure 2:
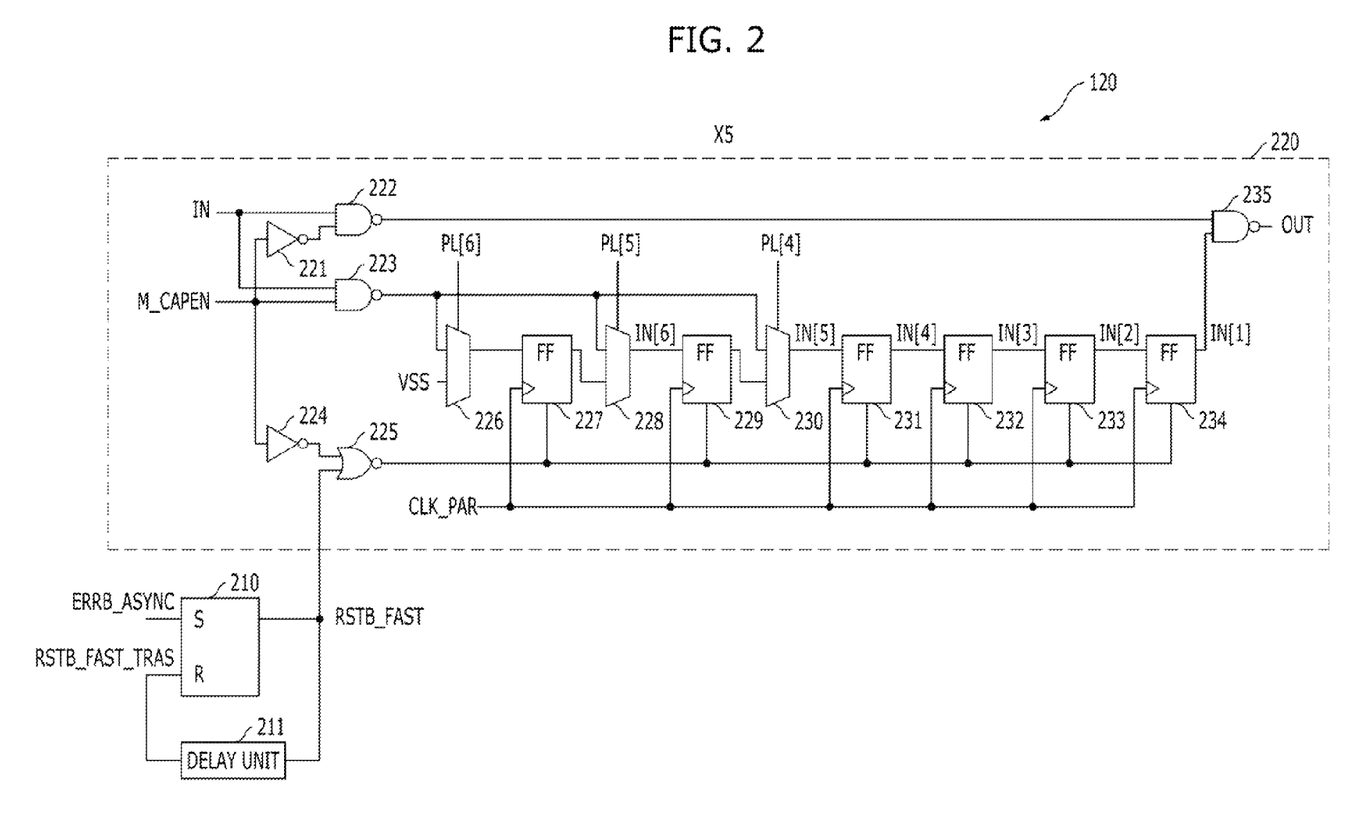
FIG. 2 is a configuration diagram illustrating a command shift circuit 120 shown in FIG. 1.

FIG. 2 is a configuration diagram of the command shift circuit 120 of FIG. 1 in accordance with an embodiment.

Referring to FIG. 2, the command shift circuit 120 includes a SR latch 210, a delay unit 211, and shift registers 220.

The SR latch 210 is configured to use an asynchronous error signal ERRB_ASYNC as a set signal, and a fast reset signal RSTB_FAST_TRAS delayed by the delay unit 211 as a reset signal, and to generate a fast reset signal RSTB_FAST. The SR latch 210 activates the fast reset signal RSTB_FAST to '0' in response to the activated asynchronous error signal ERRB_ASYNC, and deactivates the fast reset signal RSTB_FAST to '1' in response to the activation of the delayed fast reset signal RSTB_FAST_TRAS. For example, a delay value of the delay unit 211 may be set at about tRAS min (ACT to PRE command period: a minimum value of a time from an active command to a precharge command) of the memory device.

For example, the five shift registers 220 are provided corresponding to the number of the command signals CST, ACTT, CAST, RAST, and WET (FIG. 2 illustrates only one shift register 220). In FIG. 2, an input signal IN corresponds to the command signals CST, ACTT, CAST, RAST, and WET, and an output signal OUT corresponds to the shifted command signals CST_PL, ACTT_PL, CAST_PL, RAST_PL, and WET_PL.

The shift register 220 includes inverters 221 and 224, NAND gates 222, 223, and 235, a NOR gate 225, multiplexers 226, 228, and 230, and flip-flops 227, 229, 231, 232, 233, and 234. A parity mode signal M_CAPEN has a level '1' when a parity check function is activated, and has a level '0' when the parity check function is deactivated. When the parity mode signal M_CAPEN is '0', the input signal IN is output by passing through only the NAND gates 222 and 235. That is, when the parity check function is deactivated, the shift register 220 outputs the input signal IN as the output signal OUT without shifting the input signal IN. When the parity mode signal M_CAPEN is '1', the input signal IN is transferred to the multiplexers 226, 228, and 230 through the NAND gate 223.

Signals PL[6], PL[5] and PL[4] input to the multiplexers 226, 228, and 230 indicate parity latency (PL). The parity latency may be set by a mode register set MRS, wherein when the parity latency is respectively set to 4, 5, or 6, the respective signal among PL[4], PL[5], and PL[6] is activated. The flip-flops 227, 229, 231, 232, 233, and 234 are configured to delay and output their own input signals by one clock in synchronization with the control clock CLK_PAR, respectively. When the signal PL[4] is activated, since the input signal IN transferred through the NAND gate 223 passes through the four flip-flops 231, 232, 233, and 234, the input signal IN is shifted (delayed) by four clocks and is output as the output signal OUT. When the signal PL[5] is activated, since the input signal IN transferred through the NAND gate 223 passes through the five flip-flops 229, 231, 232, 233, and 234, the input signal IN is delayed by five clocks and is output as the output signal OUT. When the signal PL[6] is activated, since the input signal IN transferred through the NAND gate 223 passes through the six flip-flops 227, 229, 231, 232, 233, and 234, the input signal IN is delayed by six clocks and is output as the output signal OUT.

When the parity mode signal M_CAPEN is activated to '1' and the fast reset signal RSTB_FAST is activated to '0', an output signal of the NOR gate 225 is of a level '1', and all signals stored in the flip-flops 227, 229, 231, 232, 233, and 234 are initialized to '0'. That is, when the asynchronous error signal ERRB_ASYNC is activated to '0', the command shift circuit 120 initializes all command signals being shifted therein to '0'.

Signals IN[6], IN[5], IN[4], IN[3], IN[2], and IN[1] in a shift register, which shifts a chip select signal CST, of the five shift registers 220 are transferred to and used by the clock control circuit 110. Furthermore, the signal IN[1] in the shift register, which shifts the chip select signal CST of the five shift registers 220, is transferred to and used by the parity circuit 140.

Figure 3:
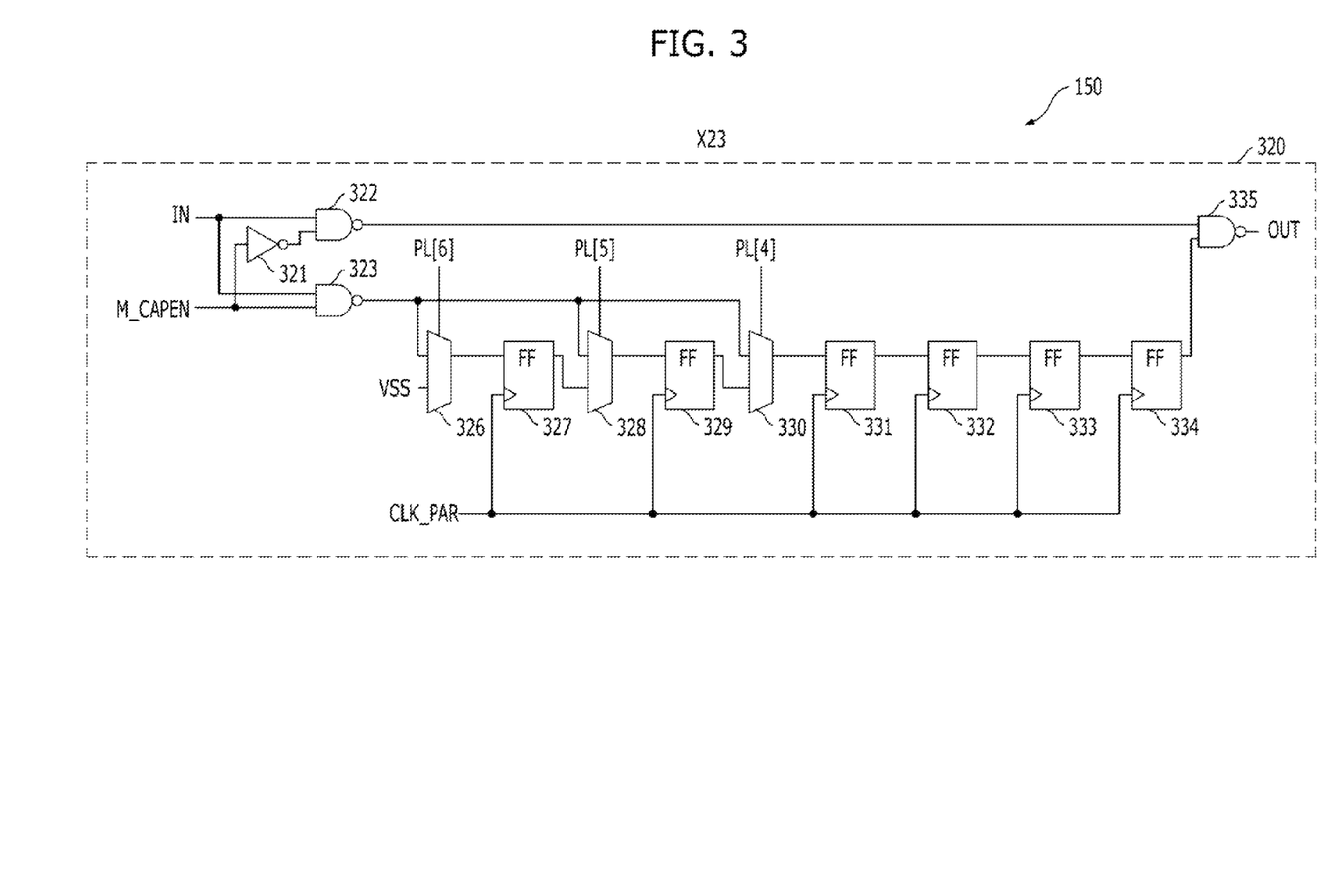
FIG. 3 is a configuration diagram illustrating a command/address shift circuit 150 shown in FIG. 1.

FIG. 3 is a configuration diagram illustrating the command/address shift circuit 150 shown in FIG. 1.

Referring to FIG. 3, the command/address shift circuit 150 includes shift registers 320.

For example, the 23 shift registers 320 are provided corresponding to the number of the five command signals CST, ACTT, CAST, RAST, and WET and the 18 address signals A<0:13>, BK<0:1>, and BG<0:1> (FIG. 3 illustrates only one shift register 320). In FIG. 3, an input signal IN corresponds to the command signals CST, ACTT, CAST, RAST, and WET and the address signals A<0:13>, BK<0:1>, and BG<0:1>, and an output signal OUT corresponds to the shifted command signals CST_PL, ACTT_PL, CAST_PL, RAST_PL, and WET_PL and the shifted address signals A_PL<0:13>, BK_PL<0:1>, and BG_PL<0:1>.

The shift register 320 of the command/address shift circuit 150 has a configuration similar to that of the shift register 220 of the command shift circuit 120. However, the shift register 320 is different from the shift register 220, in that the shift register 320 does not have a configuration for resetting flip-flops 327, 329, 331, 332, 333, and 334. The reason for the difference between the two circuits 220 and 320 is because the command shift circuit 120 should substantially prevent the erroneous commands CST_PL, ACTT_PL, CAST_PL, RAST_PL, and WET_PL from being transferred to the decoder circuit 130 when an error is detected, but the command/address shift circuit 150 should transfer the commands CST_PL, ACTT_PL, CAST_PL, RAST_PL, and WET_PL and the addresses A_PL<0:13>, BK_PL<0:1>, and BG_PL<0:1> to the error log circuit 160 when an error is detected.

Figure 4:
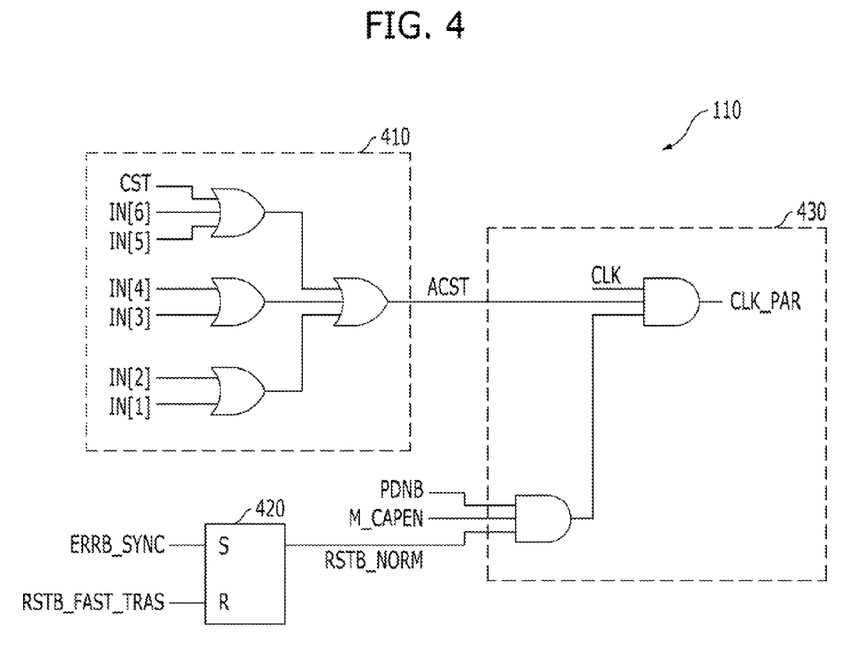
FIG. 4 is a configuration diagram illustrating a clock control circuit 110 shown in FIG. 1.

FIG. 4 is a configuration diagram of the clock control circuit 110 of FIG. 1 in accordance with an embodiment.

Referring to FIG. 4, the clock control circuit 110 includes a chip selection signal combination unit 410, a SR latch 420, and a clock buffering unit 430.

The chip selection signal combination unit 410 is configured to receive the chip select signal CST, and the signals IN[6], IN[5], IN[4], IN[3], IN[2], and IN[1], in the shift registers 220 of the command shift circuit 120, which correspond to chip select signal CST. When at least one of the chip select signal CST and the signals IN[6], IN[5], IN[4], IN[3], IN[2], and IN[1] is activated to '1', the chip selection signal combination unit 410 activates an output signal ACST to a level '1'. When all of the chip select signal CST and the signals IN[6], IN[5], IN[4], IN[3], IN[2], and IN[1] are deactivated to '0', the chip selection signal combination unit 410 deactivates the output signal ACST to a level '0'. Among the command signals CST, ACTT, CAST, RAST, and WET, the chip select signal CST indicates the validity of a command. The other command signals ACTT, CAST, RAST, and WET are ignored when the chip select signal CST dose not stay activated at '1'. The deactivation of the output signal ACST to '0' represents that the chip select signal CST has not been activated for about four to six clocks. That is, the deactivation of the output signal ACST represents that there is no valid command in the command signals being shifted in the command shift circuit 120.

The SR latch 420 is configured to receive the synchronous error signal ERRB_SYNC as a set signal, and the delayed fast reset signal RSTB_FAST_TRAS (refer to FIG. 2) as a reset signal, and to generate a normal reset signal RSTB_NORM. When the synchronous error signal ERRB_SYNC is activated to '0', the SR latch 420 activates the normal reset signal RSTB_NORM to '0' in response to the activation of the synchronous error signal ERRB_SYNC. When the delayed fast reset signal RSTB_FAST_TRAS is activated to '0', the SR latch 420 deactivates the normal reset signal RSTB_NORM to '1' in response to the activation of the delayed fast reset signal RSTB_FAST_TRAS.

The clock buffering unit 430 is configured to buffer the clock CKL to the control clock CLK_PAR or deactivate the control clock CLK_PAR (fix the control clock CLK_PAR to a level '0') in response to the parity mode signal M_CAPEN, a power-down signal PDNB, the output signal ACST of the chip selection signal combination unit 410, and the normal reset signal RSTB_NORM. The power-down signal PDNB has a level '0' in a power-down mode and has a level '1' in a mode other than the power-down mode. The clock CLK is applied from an external source. The clock buffering unit 430 is configured to buffer the clock CKL to the control clock CLK_PAR when all of the parity mode signal M_CAPEN, the power-down signal PDNB, the output signal ACST of the chip selection signal combination unit 410, and the normal reset signal RSTB_NORM have a level '1', and to deactivate the control clock CLK_PAR in other cases. As a consequence, the control clock CLK_PAR is deactivated when one or more of the following conditions (1) to (4) are satisfied: (1) When there is no valid command signal in the command signals being shifted in the command shift circuit 120, (2) When an error of a command is detected by the parity circuit 140, (3) When the parity check function is deactivated, and (4) When a current mode is the power-down mode.

Figure 5:
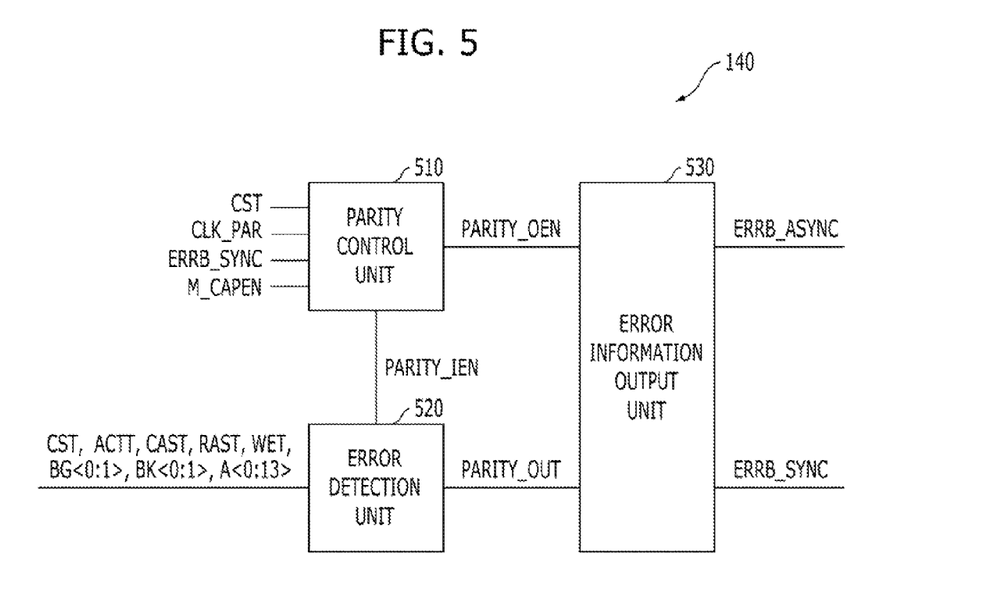
FIG. 5 is a configuration diagram illustrating a parity circuit 140 shown in FIG. 1.

FIG. 5 is a configuration diagram illustrating the parity circuit 140 shown in FIG. 1 in accordance with an embodiment.

Referring to FIG. 5, the parity circuit 140 includes a parity control unit 510, an error detection unit 520, and an error information output unit 530.

The parity control unit 510 is configured to generate a parity input enable signal PARITY_IEN using the control clock CLK_PAR and the chip select signal CST, and to delay the parity input enable signal PARITY_IEN to generate a parity output enable signal PARITY_OEN.

The error detection unit 520 is configured to receive the command signals CST, ACTT, CAST, RAST, and WET and the address signals A<0:13>, BK<0:1>, and BG<0:1> in synchronization with the parity input enable signal PARITY_IEN, to perform a parity operation on the signals, and to generate an error signal PARITY_OUT indicating the detection of an error as a result of the parity operation.

The error information output unit 530 is configured to output the error signal PARITY_OUT as asynchronous error information ERRB_ASYNC at the time of activation of the parity output enable signal PARITY_OEN, and to shift the error signal PARITY_OUT up to a time point corresponding to the parity latency to output synchronous error information ERRB_SYNC.

The parity control unit 510, the error detection unit 520, and the error information output unit 530 will be described in detail with reference to FIG. 6 to FIG. 8.

Figure 6:
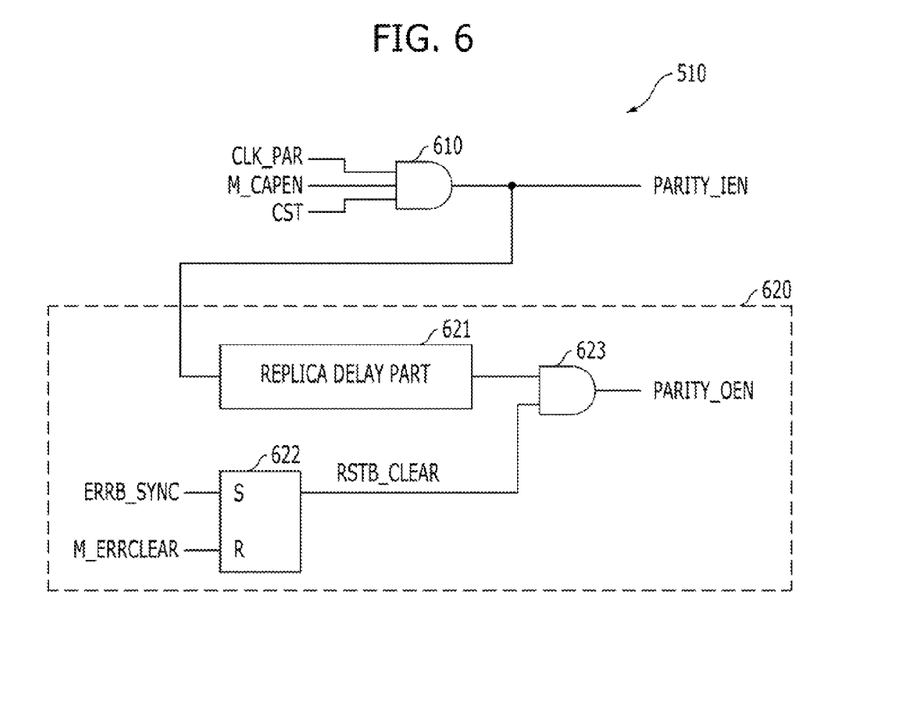
FIG. 6 is a configuration diagram illustrating a parity control unit 510 shown in FIG. 5.

FIG. 6 is a configuration diagram of the parity control unit 510 of FIG. 5 in accordance with an embodiment.

Referring to FIG. 6, the parity control unit 510 includes a parity input enable signal generation section 610 and a parity output enable signal generation section 620.

The parity input enable signal generation section 610 includes an AND gate configured to receive the control clock CLK_PAR, the parity mode signal M_CAPEN, and the chip select signal CST. The parity input enable signal generation section 610 is configured to activate the parity input enable signal PARITY_IEN to '1' when all of the control clock CLK_PAR, the parity mode signal M_CAPEN, and the chip select signal CST stay with a value of '1'. Consequently, in the state in which the parity check function has been activated, the parity input enable signal PARITY_IEN is activated in synchronization with the control clock CLK_PAR whenever a valid command signal is input.

The parity output enable signal generation section 620 includes a replica delay part 621, a SR latch 622, and an AND gate 623.

The replica delay part 621 is a replica circuit having a delay value substantially equal to a time required for the error detection unit 520 to detect an error.

The SR latch 622 is configured to receive the synchronous error signal ERRB_SYNC as a set signal, and a memory error clear signal M_ERRCLEAR as a reset signal, and to generate an output signal RSTB_CLEAR. The memory error clear signal M_ERRCLEAR is activated by a command of the memory controller. At the time of activation of the memory error clear signal M_ERRCLEAR, an error log stored in the error log circuit 160 is cleared and a parity check operation, which is stopped due to the detection of an error, starts again. Consequently, the output signal RSTB_CLEAR is activated to '0' at the time of activation of the synchronous error signal ERRB_SYNC, and is deactivated to '1' again at the time of activation of the memory error clear signal M_ERRCLEAR.

The AND gate 623 is configured to output an output signal of the replica delay part 621 as the parity output enable signal PARITY_OEN while the output signal RSTB_CLEAR of the SR latch 622 stays deactivated to '1', and to substantially maintain the parity output enable signal PARITY_OEN deactivated to '0' while the output signal RSTB_CLEAR of the SR latch 622 stays deactivated at '0'

Figure 7:
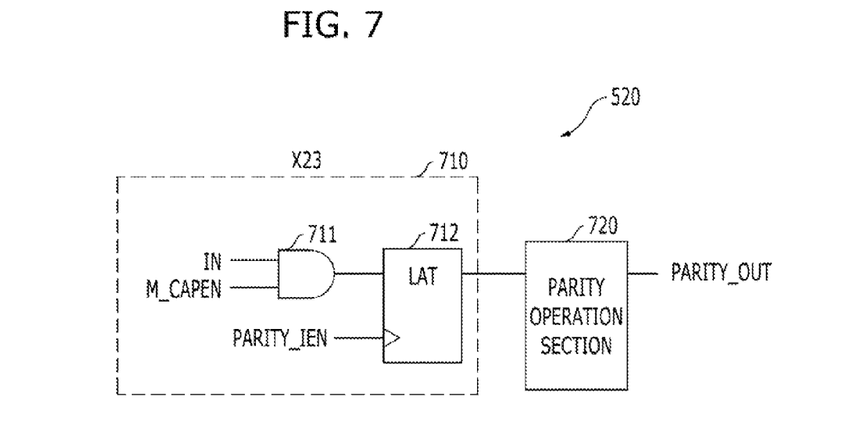
FIG. 7 is a configuration diagram illustrating an error detection unit 520 shown in FIG. 5.

FIG. 7 is a configuration diagram of the error detection unit 520 of FIG. 5 in accordance with an embodiment.

Referring to FIG. 7, the error detection unit 520 includes an input section 710 and a parity operation section 720.

The input section 710 is configured to receive and latch the command signals CST, ACTT, CAST, RAST, and WET and the address signals A<0:13>, BK<0:1>, and BG<0:1> in synchronization with the parity input enable signal PARITY_IEN in the state in which the parity mode has been activated, that is, the parity mode signal M_CAPEN is '1'. The error detection unit 520 may include a plurality of input sections 710. For example, 23 input sections 710 (FIG. 7 illustrates only one input section 710 for the sake of convenience). For example, the input section 710 may include AND gate 711 and latch circuit 712.

In FIG. 7, an input signal IN corresponds to the command signals CST, ACTT, CAST, RAST, and WET, and the address signals A<0:13>, BK<0:1>, and BG<0:1>, and an output signal OUT corresponds to the latched input signal IN, or latched command signals CST, ACTT, CAST, RAST, and WET, and the latched address signals A<0:13>, BK<0:1>, and BG<0:1>.

The parity operation section 720 is configured to determine whether the number of signals having a level '1' among the output signals OUT of the input sections 710. For example 23 signals (latched command signals CST, ACTT, CAST, RAST, and WET, and the latched address signals A<0:13>, BK<0:1>, and BG<0:1>) are even or not (even parity check). When the number of signals having a level '1' is an even, the parity operation section 720 determines that there is no error and deactivates the error signal PARITY_OUT to '0'. Furthermore, when the number of signals having a level '1' is an odd, the parity operation section 720 determines that there is an error and activates the error signal PARITY_OUT to '1'. The parity operation section 720 may include a plurality of XOR gates.

Figure 8:
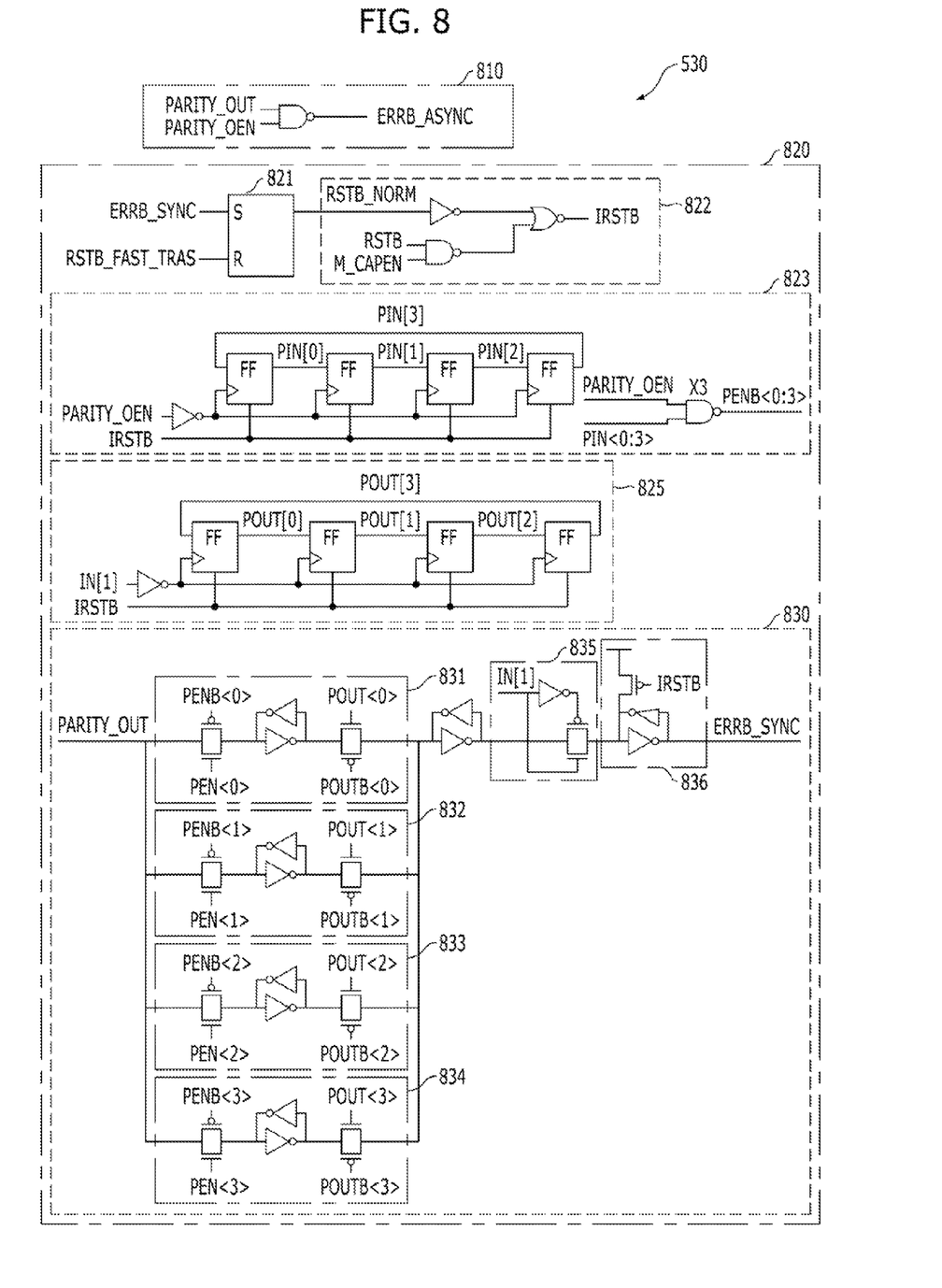
FIG. 8 is a configuration diagram illustrating an error information output unit 530 shown in FIG. 5.

FIG. 8 is a configuration diagram illustrating the error information output unit 530 shown in FIG. 5.

Referring to FIG. 8, the error information output unit 530 includes an asynchronous error information generation section 810 and a synchronous error information generation section 820.

The asynchronous error information generation section 810 is configured to combine the error signal PARITY_OUT with the parity output enable signal PARITY_OEN to generate the asynchronous error information ERRB_ASYNC. When the error signal PARITY_OUT and the parity output enable signal PARITY_OEN have a level '1', the asynchronous error information ERRB_ASYNC is activated to '0'. The asynchronous error information generation section 810 may include a NAND gate.

The synchronous error information generation section 820 includes a SR latch 821, a reset signal generation part 822, a pipe input signal generation part 823, a pipe output signal generation part 825, and a pipe circuit 830.

The SR latch 821 is configured to receive the synchronous error signal ERRB_SYNC as a set signal, and the delayed fast reset signal RSTB_FAST_TRAS (refer to FIG. 2) as a reset signal, and to generate the normal reset signal RSTB_NORM. The SR latch 821 activates the normal reset signal RSTB_NORM to '0' in response to the activation of the synchronous error signal ERRB_SYNC to '0', and deactivates the normal reset signal RSTB_NORM to '1' in response to the activation of the delayed fast reset signal RSTB_FAST_TRAS to '0'.

The reset signal generation part 822 is configured to generate a reset signal IRSTB for resetting the pipe input signal generation part 823 and the pipe output signal generation part 825 using a reset signal RSTB (a system reset signal applied from the memory controller) of the memory device, the parity mode signal M_CAPEN, and the normal reset signal RSTB_NORM. The reset signal IRSTB is activated to '0' when one or more of the following conditions (1) to (3) are satisfied: (1) When the reset signal RSTB is activated to '0', (2) When the parity mode signal M_CAPEN is deactivated to '0', and (3) When the normal reset signal RSTB_NORM is activated to '0'.

The pipe input signal generation part 823 is configured to sequentially activate signals PIN[0] to PIN[3] one by one whenever the parity output enable signal PARITY_OEN is toggled. For example, in the state in which the signal PIN[0] stays activated to '1', the signal PIN[1] is activated to '1' when the parity output enable signal PARITY_OEN is toggled once, and the signal PIN[2] is activated to '1' when the parity output enable signal PARITY_OEN is toggled for one more time. Furthermore, when the reset signal RSTB is activated to '0', the pipe input signal generation part 823 initializes the signal PIN[0] to '1', PIN[1] to '0', PIN[2] to '0', and PIN[3] to '0'. The signals PIN[0:3] are logically combined with the parity output enable signal PARITY_OEN by a NAND gate, resulting in the generation of pipe input signals PENB[0:3].

The pipe output signal generation part 825 is configured to sequentially activate signals POUT[0] to POUT[3] whenever a signal IN[1] is toggled. For example, in the state in which the signal POUT[0] has been activated to '1', when the signal IN[1] is toggled once, the signal POUT[1] is activated to '1', and when the signal IN[1] is toggled for one more time, the signal POUT[2] is activated to '1'. Furthermore, when the reset signal IRSTB is activated to '0', the pipe output signal generation part 825 initializes the signal POUT[0] to '1', the signal POUT[1] to 0', the signal POUT[2] to '0', and the signal POUT[3] to '0'. The signal IN[1] is an internal signal (IN[1], refer to FIG. 2) in a shift register which shifts the chip select signal CST among the shift registers 220 of the command shift circuit 120, and is activated at a time point corresponding to the parity latency.

The pipe circuit 830 includes pipes 831 to 834, an output control unit 835, and a reset unit 836. The pipes 831 to 834 are respectively configured to receive and store the error signal PARITY_OUT in response to the respective pipe input signals PENB[0:3] of their own, and to output the stored error signal in response to the respective pipe output signals POUT[0:3] of their own. The output control unit 835 is configured to forward the output signal from the pipes 831 to 834, as the synchronous error signal ERRB_SYNC whenever the signal IN[1] is activated to '1'. The reset unit 836 is configured to initialize the synchronous error signal ERRB_SYNC to a state of '0' when the reset signal IRSTB is activated to '0'.

Figure 9:
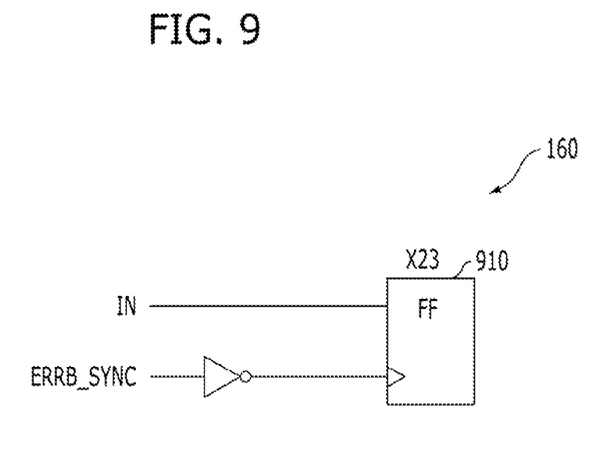
FIG. 9 is a configuration diagram illustrating an error log circuit 160 shown in FIG. 1.

FIG. 9 is a configuration diagram illustrating the error log circuit 160 shown in FIG. 1.

Referring to FIG. 9, the error log circuit 160 may include a plurality of, for example, 23 flip-flops 910 (FIG. 9 illustrates only one flip-flop). The 23 flip-flops 910 are configured to store the command signals CST_PL, ACTT_PL, CAST_PL, RAST_PL, and WET_PL and the address signals A_PL<0:13>, BK_PL<0:1>, and BG_PL<0:1>. They correspond to the 23 flip-flops 910, whenever the synchronous error information ERRB_SYNC is activated to '0'. In FIG. 9, an input signal IN corresponds to the commands CST_PL, ACTT_PL, CAST_PL, RAST_PL, and WET_PL and the addresses A_PL<0:13>, BK_PL<0:1>, and BG_PL<0:1>.

The information stored in the error log circuit 160 is transferred to the memory controller, and the memory controller determines an erroneous command of the commands, which have been applied from the memory controller to the memory device, using the error log transferred from the error log circuit 160.

While the present invention has been described with respect to the specific embodiments, it will be apparent to those skilled in the art that various changes and modifications may be made without departing from the spirit and scope of the invention as defined in the following claims.

Particularly, in the embodiment of the invention, command signals and address signals used in a DRAM of the memory device have been described as an example. However, the type of the command signals and the number of address signals may be changed. Furthermore, the invention may be applied to all kinds of memory devices that detect whether an error is detected in a command.

What is claimed is:

1. A memory device comprising:
a parity circuit configured to detect an error using a plurality of command signals and a plurality of address signals, to generate asynchronous error information at the time of the error detection, and to generate synchronous error information by synchronizing the asynchronous error information with parity latency;
a command shift circuit configured to shift the plurality of command signals by a delay value corresponding to the parity latency in synchronization with a control clock, to output shifted command signals, and to initialize command signals being shifted when the asynchronous error information indicates generation of an error;
a clock control circuit configured to deactivate the control clock when there is no valid command signal among command signals being shifted in the command shift circuit;
a decoder circuit configured to decode command signals output from the command shift circuit;
a command/address shift circuit configured to shift the plurality of command signals and the plurality of address signals by a delay value corresponding to the parity latency in synchronization with the control clock, to output shifted command signals and address signals; and
an error log circuit configured to store command signals and address signals, which has been shifted by the command/address shift circuit, when the synchronous error information is activated.

2. The memory device of claim 1, wherein the clock control circuit is configured to deactivate the control clock when one or more of conditions (1) to (4) are satisfied: (1) When there is no valid command signal in the command signals being shifted in the command shift circuit, (2) When the synchronous error information indicates generation of an error, (3) When a parity check function is deactivated, and (4) When a current mode is a power-down mode.

3. The memory device of claim 1, wherein the command shift circuit includes a plurality of shift registers configured to shift command signals corresponding to the plurality of shift registers among the plurality of command signals.

4. The memory device of claim 3, wherein the plurality of command signals include a chip select signal, and the clock control circuit is configured to detect whether an activated chip select signal exists in a shift register corresponding to the chip select signal.

5. The memory device of claim 1, wherein the plurality of command signals include a chip select signal, and the parity circuit comprises:
a parity control unit configured to generate a parity input enable signal using the control clock and the chip select signal, and to delay the parity input enable signal to generate a parity output enable signal;
a error detection unit configured to receive the plurality of command signals and the plurality of address signals in synchronization with the parity input enable signal, and to generate an error signal indicating presence or absence of an error; and
an error information output unit configured to output the error signal as the asynchronous error information at a time of activation of the parity output enable signal, and to shift the error signal up to a time point corresponding to the parity latency to output the synchronous error information.

6. The memory device of claim 5, wherein the parity control unit is configured to substantially maintain the parity output enable signal in a deactivated state when the synchronous error information is activated, and the error information output unit is configured to stop a shift operation for generating the synchronous error information when the synchronous error information is activated.

7. The memory device of claim 1, further comprising:
a reception circuit configured to receive the plurality of command signals and the plurality of address signals from an exterior of the memory device.

8. The memory device of claim 1, wherein, when the parity check function is deactivated, the command shift circuit transfers the plurality of command signals to the decoder circuit without shifting the plurality of command signals, the parity circuit does not detect the presence or absence of the error, the clock control circuit deactivates the control clock, and the command/address shift circuit transfers the plurality of command signals and the plurality of address signals to the error log circuit without shifting the plurality of command signals and the plurality of address signals.

* * * * *